United States Patent [19]
Blonstein et al.

[11] Patent Number: 5,218,650
[45] Date of Patent: Jun. 8, 1993

[54] QUANTIZATION METHOD FOR USE IN IMAGE COMPRESSION

[75] Inventors: Steven M. Blonstein, San Jose; James D. Allen, Santa Cruz, both of Calif.

[73] Assignees: Ricoh Corporation, Menlo Park, Calif.; Ricoh Ltd., Japan

[21] Appl. No.: 841,268

[22] Filed: Feb. 25, 1992

Related U.S. Application Data

[63] Continuation of Ser. No. 635,831, Jan. 2, 1991, abandoned.

[51] Int. Cl.[5] .............................................. G06K 9/36
[52] U.S. Cl. ........................................ 382/56; 382/17; 364/745; 358/135
[58] Field of Search ................ 382/17, 56; 358/133, 358/135, 433; 364/715.02, 745

[56] References Cited

U.S. PATENT DOCUMENTS

| | | | |
|---|---|---|---|
| 4,698,689 | 10/1987 | Tzou | 358/135 |
| 4,703,349 | 10/1987 | Bernstein | 382/56 |
| 4,727,506 | 2/1988 | Fling | 364/745 |
| 4,754,492 | 6/1988 | Malvar | 382/56 |
| 4,755,961 | 7/1988 | Kuriki et al. | 364/745 |
| 4,797,945 | 1/1989 | Suzuki et al. | 382/56 |
| 4,809,207 | 2/1989 | Nillesen | 364/745 |
| 4,922,544 | 5/1990 | Stansfield et al. | 382/56 |
| 4,999,705 | 3/1991 | Puri | 358/135 |
| 5,001,559 | 3/1991 | Gonzales et al. | 358/135 |

Primary Examiner—Jose L. Couso
Attorney, Agent, or Firm—Heller, Ehrman, White & McAuliffe

[57] ABSTRACT

A novel quantization method for use in image compression techniques provides a 3–6% improvement in compression which is achieved with minimal additional hardware or software and yet which is compatible with proposed standard techniques.

14 Claims, 2 Drawing Sheets

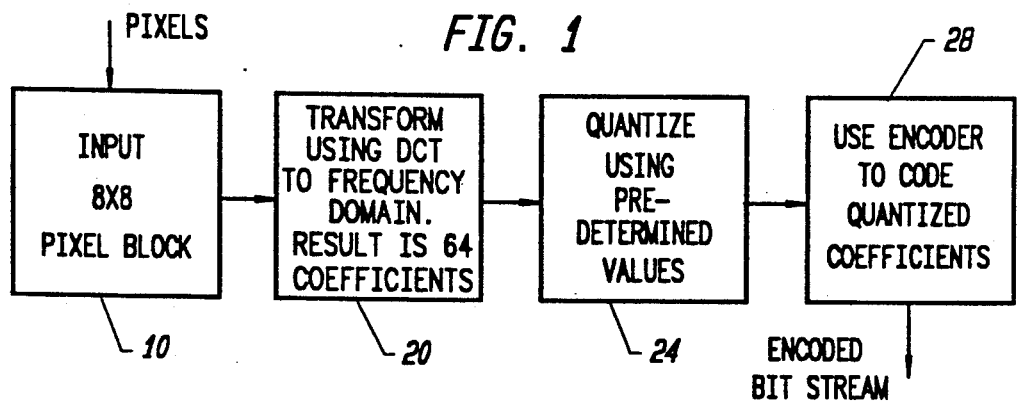
FIG. 1
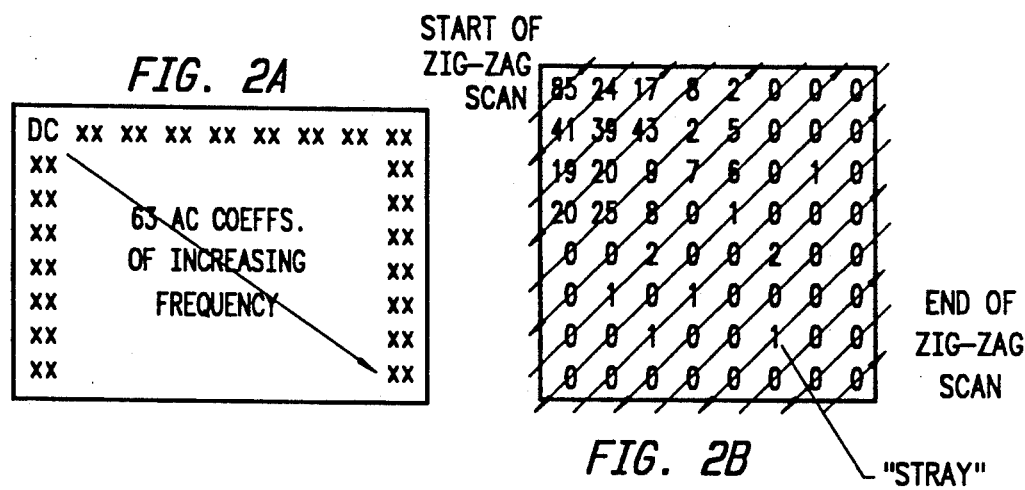
FIG. 2A
FIG. 2B
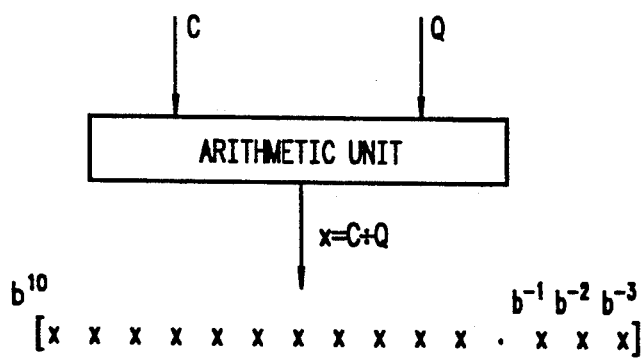
FIG. 3
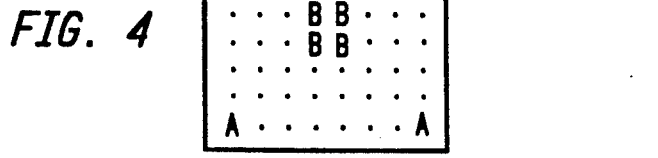
FIG. 4

QUANTIZATION METHOD FOR USE IN IMAGE COMPRESSION

This is a continuation of application Ser. No. 07/635,831 filed Jan. 1, 1991 now abandoned.

BACKGROUND OF THE INVENTION

The present invention relates to a novel quantization method for use in an image compression system.

The actual data compression in image compression is achieved at the quantization step of the overall process. The principle behind the forthcoming JPEG international standard is to transform the spatial dimension (pixel data) to a series of 2 dimensional discrete cosine transform coefficients. It is these coefficients that are quantized in software or hardware and subsequently encoded to achieve actual compression.

SUMMARY OF THE INVENTION

It is an object of the present invention to provide an improved quantization method for use in image compression techniques. The improved quantization process yields a 3-6% improvement in compression (given a certain error level in the compressed file). It is important to note that this is achieved with minimal additional hardware and leaves the system still 100% compatible with the proposed standard. By using a rounding technique, a 3 to 6% gain in compression can be achieved with no additional loss of quality.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 shows the data flow for a typical image compression apparatus.

FIGS. 2A and 2B show the general arrangement of transform coefficients as utilized in image compression techniques.

FIG. 3 illustrates the calculation of quantization.

FIG. 4 shows a representation of a block of pixels.

DETAILED DESCRIPTION OF THE PREFERRED EMBODIMENTS

Figure 5:
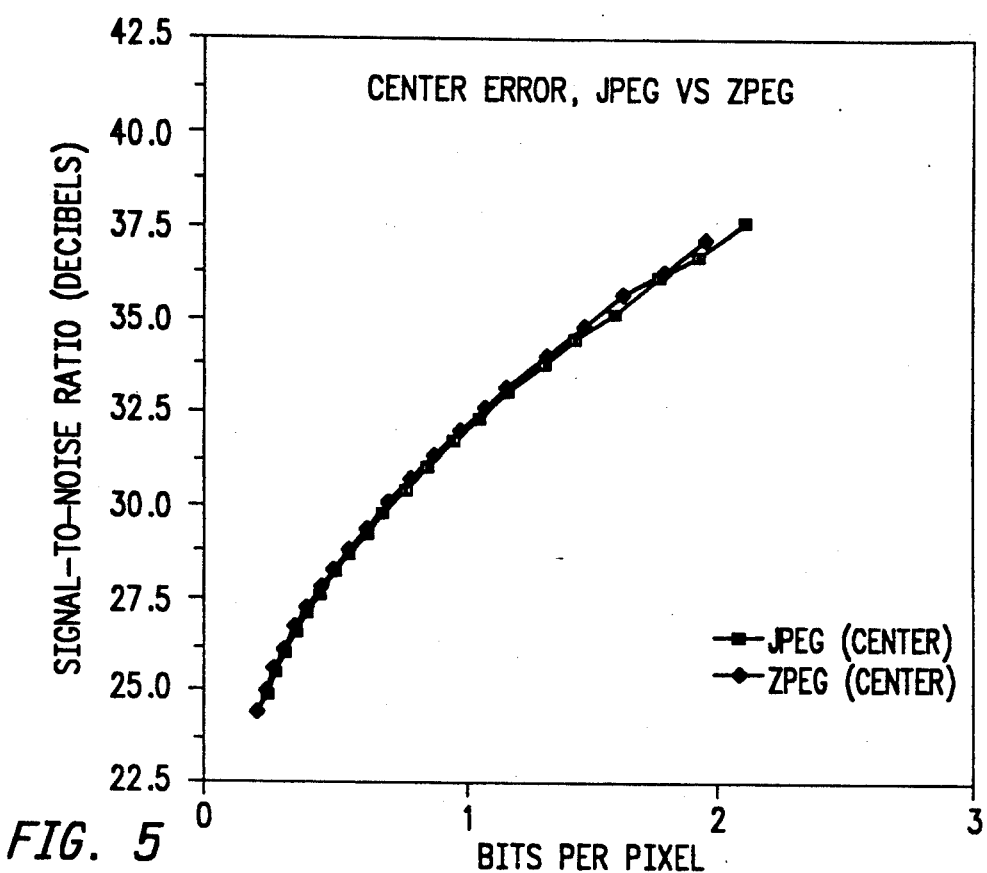
FIGS. 5 and 6 show the results of qualtization of typical test images of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

In FIG. 1, the flow of data shows pixels being input to the front end 10 of the system. A typical representation of the pixel values is 0 to 255 or −128 to +127. These values require 8 bits of data to represent.

The second stage is the transform 20. Even though the transform involves multiplication and/or additions by factors other than integers, the end result of the transform is 64 frequency coefficients whose range is typically −1024 to +1023. These can be represented by 11 bit numbers. These numbers are still considered to be integers.

The third stage 24 (shown with darker boundary) is the area of real interest. It is the quantization that actually achieves the compression by reducing many of the high frequency components to zero. The quantization may vary depending upon the coefficient in question. Empirical experimentation has shown that some coefficients can be "suppressed" without an adverse effect on image quality. The actual numerical operation for the quantization is a division by a quantization factor Q. If the result is a number x (as shown in FIG. 3) then we would express x as:

$$x = C \div Q$$

where C is the coefficient value before quantization.

Although allowable values for C are in the range of −1024 to +1024, and for Q the range is 1 to 512, typical values for both will generally be smaller. Much of the time the division of C by Q will result in a small number in the range of −5 to +5. With these small numbers, the value to the right of the decimal point can have a critical effect on the integer value chosen for x. Simple truncation to the right of the decimal point would not be acceptable.

The proposed JPEG international standard proposes the following scheme for rounding of the value x.

| | | |
|---|---|---|
| −0.5 < x < +0.5 | implies setting | x = 0 |
| 0.5 < x < +1.5 | implies setting | x = 1 |
| 1.5 < x < 2.5 | implies setting | x = 2 etc. |

The present invention (referred to as "Z" quantization) uses the metric:

| | | |
|---|---|---|
| −0.625 < x < +0.625 | implies setting | X = 0 |
| 0.625 < x < +1.625 | implies setting | x = 1 |
| 1.625 < x < +2.625 | implies setting | x = 2e |

At first glance, the difference between the two approaches may seem very small. However, the net effect on compression ratio, for a given error level, is an improvement of 3 to 6%. A description of the encoder will help explain why.

FIG. 2a shows the general arrangement for the 64 transform coefficients. The DC value resides in the top left-hand corner, and the remaining 63 AC coefficients are in order of increasing horizontal and vertical frequency as one moves to the bottom right hand corner.

FIG. 2b shows some typical values that may occur for an 8×8 pixel block. The international standard calls for the encoder to "zig-zag" scan through the AC coefficients. The reason for this approach is to lengthen runs of zeros where greatest compression is achieved As shown in this figure, "stray" ones (highlighted in FIG. 2b) often break up otherwise long runs of zeros. Let's say that the value at the marked "stray" 1 was 0.609 before rounding. Using the JPEG metric, the value is rounded up to 1.

The present invention rounds the 0.609 down to zero. Under the JPEG system, the last 18 coefficients are coded as 10 zeros, a 1, and then 7 zeros. With the present invention, the last 18 coefficients are coded as a run of 18 zeros. The net result is longer runs of zeros, hence the name "Z" quantization.

One of the big advantages of the improved quantization method is that it remains 100% compatible with the proposed standard. At the decompression end of the system, the decompressor does not need to know whether JPEG or "Z" was used during quantization.

The choice of the value 0.625 for "Z" quantization seems optimal for several reasons. Even so, values other than 0.5 for the "Z" quantization may be acceptable. A higher value such as 0.75 would probably hurt high bit rate compressions where accuracy is essential. A value of less than 0.625 would probably only yield a gain of say 1 to 2% and may not be worthwhile.

Choosing 0.625 yields 3 to 6% and is easy to implement in hardware or software. Consider the output of the x=C/Q calculation, as shown in FIG. 3.

The value x, after rounding, will be an 11 bit integer. Rounding will involve examination of bits to the right of the decimal place ($b^{-1}$ to $b^{-3}$). The JPEG algorithm needs to look at just bit $b^{-1}$ to do the rounding:

if $b^{-1}=1$ and $b^{10}=0$, then add 1 to x

The "Z" quantization approach according to the present invention requires only a slightly more complicated algorithm for the rounding:

if $b^{-1}=1$ and ($b^{-2}$ or $b^{-}=1$) and $b^{10}=0$, then add 1 to x

Similar logic can be applied to negative numbers.

Results

The discrete cosine transform introduces differing degrees of errors at various places in the 8×8 pixel block. For comparison purposes, we will consider the data at the corner pixels "A", and center pixels "B". FIG. 4 shows a representation of the block of pixels.

The proposed "Z" quantization method reduces errors everywhere, but is particularly effective at the corner pixels "A".

Figure 6:
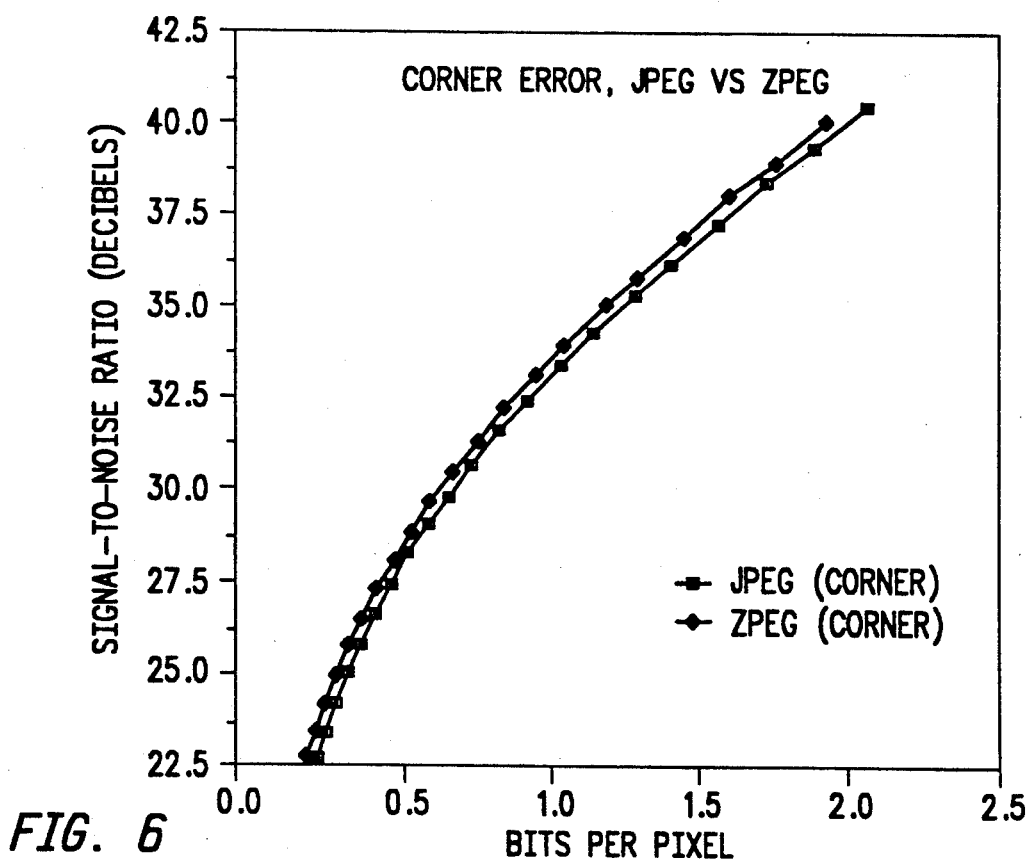

FIGS. 5 and 6 show the results for a typical test image. At given bit rates, the "Z" quantization approach is marginally better than JPEG on the center pixels (see FIG. 5 and note that higher SNR equates to less error). On the corner pixels "B", the difference is much more significant. This is where most of the win will come, as seen in FIG. 6.

A very simple change to the quantization circuitry in a JPEG image compression system can yield significant gains in the compression ratio (3-6%) for very little added cost. The quantization method maintains full compatibility with the proposed standard. The choice of the value 0.625 seems close to optimal from the standpoint of both effectiveness and ease of implementation.

The foregoing descriptions of specific embodiments of the present invention have been presented for purposes of illustration and description. They are not intended to be exhaustive or to limit the invention to the precise forms disclosed, and it should be clear that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A quantization apparatus for use in image compression, the apparatus comprising:

means for receiving input pixels of N by N pixel blocks, means for transforming said pixel blocks to a frequency domain format resulting in a plurality of frequency transform coefficients including a DC coefficient and a plurality of AC coefficients, means for quantizing said frequency coefficients to form multi-bit integers, each integer including a most significant bit and including at least three decimal bits representative of a positive or negative fractional value, means for examining the first decimal bit and the second or third decimal bits of said integers, means for examining the most significant bits of said integers, means for adding a logical one to each of said integers only if said first decimal bit and said second or third decimal bits are a logical one and said most significant bit is a logical zero, and means for run length encoding of said integers.

2. The apparatus as in claim 1 wherein said means for quantizing include hardware means.

3. The apparatus as in claim 1 wherein said means for quantizing include software means.

4. The apparatus as in claim 1 wherein said fractional value is between the range of 0.625 and 0.750.

5. The apparatus as in claim 1 including means for adding a logical one to said integer if said fractional value is approximately 0.625.

6. The apparatus as in claim 4 wherein said pixel blocks include center pixels and corner pixels and wherein said means for quantizing include means for quantizing said center pixels.

7. The apparatus as in claim 6 including means for quantizing said corner pixels.

8. A quantization apparatus for use in image compression, the apparatus comprising:

means for receiving input pixels of N by N pixel blocks;

means for transforming said pixel blocks to a frequency domain format resulting in a plurality of frequency transform coefficients including a DC coefficient and a plurality of AC coefficients;

means for quantizing said frequency coefficients by division by a quantization factor to form multi-bit numbers, each multi-bit number having a sign, an integer portion and positive fractional portion, the value of the multi-bit number being equal to said sign times the sum of said integer portion and said fractional portion;

means for mapping each of said multi-bit numbers to a mapped integer, wherein said mapped integer is equal to zero if the corresponding multi-bit number is between a positive fractional quantity and a negative fractional quantity, wherein said positive fractional quantity is greater than 0.5 and said negative fractional quantity is less than −0.5, thereby increasing the number of multi-bit numbers mapped to zero; and means for run length compression encoding of said integers.

9. The quantization apparatus of claim 8 wherein said fractional portion is represented by at least two bits.

10. The quantization apparatus of claim 9 wherein said fractional portion is represented by at least three bits.

11. The quantization apparatus of claim 9 wherein said positive fractional quantity is approximately 0.750 and said negative fractional quantity is approximately −0.750.

12. The quantization apparatus of claim 10 wherein said positive fractional quantity is approximately 0.625 and said negative fractional quantity is approximately −0.625.

13. The quantization apparatus of claim 8 wherein said positive fractional quantity is equal to the negative of said negative fractional quantity.

14. The quantization apparatus of claim 13 further including means for mapping each of said multi-bit numbers having an integer portion of value less than a cutoff integer to a mapped integer, wherein said mapped integer has the sign and value of the sign and integer portion of the corresponding multi-bit number, respectively, if the fractional portion of the corresponding multi-bit number is between zero and said positive fractional quantity, and wherein said mapped integer has the sign of the corresponding multi-bit number and an integer value one greater than the integer portion of the corresponding multi-bit number if the fractional portion of the corresponding multi-bit number is between one and said positive fractional quantity.

* * * * *